(12) United States Patent
Fredrickson et al.

(10) Patent No.: US 7,738,760 B2
(45) Date of Patent: Jun. 15, 2010

(54) OPTICAL POLISHING FIXTURE

(75) Inventors: Brian M. Fredrickson, Rochester, MN (US); Greg A. Schumacher, Plainview, MN (US); Jill B. Christie, St. Charles, MN (US); Curtis J. Spinler, Owatonna, MN (US)

(73) Assignee: Domaille Engineering, LLC, Rochester, MN (US)

( * ) Notice: Subject to any disclaimer, the term of this patent is extended or adjusted under 35 U.S.C. 154(b) by 0 days.

(21) Appl. No.: 12/053,136

(22) Filed: Mar. 21, 2008

(65) Prior Publication Data

US 2009/0060443 A1    Mar. 5, 2009

Related U.S. Application Data

(60) Provisional application No. 60/896,714, filed on Mar. 23, 2007.

(51) Int. Cl.
    *G02B 6/00*    (2006.01)
(52) U.S. Cl. .................. 385/136; 385/85; 385/134; 385/137; 385/138; 385/147; 451/41; 451/364; 451/365
(58) Field of Classification Search ............ 385/85, 385/134, 137–138, 147; 451/41, 364, 365
See application file for complete search history.

(56) References Cited

U.S. PATENT DOCUMENTS

| | | | |
|---|---|---|---|
| 4,693,035 | A | 9/1987 | Doyle |
| 4,831,784 | A | 5/1989 | Takahashi |
| 4,979,334 | A | 12/1990 | Takahashi |
| 5,216,846 | A * | 6/1993 | Takahashi .................... 451/57 |
| 5,218,786 | A * | 6/1993 | Takahashi ................... 451/177 |
| 5,265,381 | A * | 11/1993 | Takahashi .................... 451/41 |
| 5,351,445 | A * | 10/1994 | Takahashi ................... 451/271 |
| 5,412,747 | A * | 5/1995 | Matsuoka et al. ............. 385/85 |
| 5,461,689 | A * | 10/1995 | Matsuoka et al. ............. 385/85 |

(Continued)

FOREIGN PATENT DOCUMENTS

JP    63283854 A    11/1988

(Continued)

OTHER PUBLICATIONS

English Abstract of JP 08108358, published Apr. 30, 1996, Seiko Giken:KK, 1 page.

(Continued)

*Primary Examiner*—Ryan Lepisto
(74) *Attorney, Agent, or Firm*—Fredrikson & Byron, PA

(57) ABSTRACT

An optical polishing fixture for securing one or more optical connectors can include a fixture base having a connector slot for receiving an optical connector and a clamping assembly mounted to the fixture base proximate the connector slot. The connector slot can be defined by at least one side wall defining a side wall plane and the clamping assembly can include a clamp pad moveable relative to the fixture base between a clamping position and a loading position. The clamp pad may move relative to the fixture base at an angle of less than 45 degrees relative to one of (i) a top surface of the fixture base, (ii) a plane perpendicular the side wall plane, or (iii) a plane defined by a portion of the fixture base top surface proximate to the connector slot.

19 Claims, 9 Drawing Sheets

U.S. PATENT DOCUMENTS

| | | | |
|---|---|---|---|
| 5,463,709 A * | 10/1995 | Terao et al. ................... 385/85 |
| 5,547,418 A | 8/1996 | Takahashi |
| 5,640,475 A * | 6/1997 | Takahashi ................... 385/85 |
| 5,643,064 A | 7/1997 | Grinderslev et al. |
| 5,743,787 A * | 4/1998 | Ishiyama et al. .............. 451/41 |
| 6,077,154 A | 6/2000 | Takashi et al. |
| 6,165,055 A | 12/2000 | Takahashi et al. |
| 6,238,278 B1 * | 5/2001 | Haftmann ................... 451/279 |
| 6,257,971 B1 | 7/2001 | Takahashi et al. |
| 6,547,653 B2 * | 4/2003 | Yamada et al. .............. 451/364 |
| 6,718,111 B1 | 4/2004 | Suek et al. |
| 6,808,314 B2 | 10/2004 | Yamada et al. |
| 6,808,444 B1 * | 10/2004 | Kuprin et al. ............... 451/292 |
| 6,979,255 B2 * | 12/2005 | Yamada et al. .............. 451/364 |
| 7,001,080 B2 | 2/2006 | Minami et al. |
| 7,103,254 B2 | 9/2006 | Yamada |
| 7,118,291 B2 | 10/2006 | Arai et al. |
| 7,137,878 B2 * | 11/2006 | Yamada et al. .............. 451/367 |
| 7,165,894 B2 | 1/2007 | Arai et al. |
| 7,169,026 B2 | 1/2007 | Minami et al. |
| 7,175,514 B2 * | 2/2007 | Boyer et al. ................ 451/389 |
| D565,066 S | 3/2008 | Yamada et al. |
| 7,369,737 B2 | 5/2008 | Yamada et al. |
| 7,407,431 B2 * | 8/2008 | Lee et al. ..................... 451/5 |
| 7,494,399 B2 * | 2/2009 | Tsai et al. ..................... 451/11 |
| 7,494,402 B2 * | 2/2009 | Yamada et al. .............. 451/270 |
| 7,542,648 B2 | 6/2009 | Yamada et al. |
| 2003/0182015 A1 | 9/2003 | Domaille et al. |
| 2004/0106362 A1 * | 6/2004 | Kume et al. ................... 451/41 |
| 2006/0229006 A1 | 10/2006 | Yamada et al. |
| 2008/0212930 A1 | 9/2008 | Yamada et al. |

FOREIGN PATENT DOCUMENTS

| | | |
|---|---|---|
| JP | 08108358 A | 4/1996 |
| JP | 2001205558 A | 7/2001 |
| JP | 20033266289 A | 9/2003 |

OTHER PUBLICATIONS

English Abstract of JP 2001205558, published Jul. 31, 2001, Seikoh Giken Co. Ltd., 1 page.

English Abstract of JP 2003266289, published Sep. 24, 2003, Seikoh Giken Co. Ltd., 1 page.

English Abstract of JP 63283854, published Nov. 21, 1988, Seiko Giken:KK, 1 page.

* cited by examiner

OPTICAL POLISHING FIXTURE

CROSS REFERENCE TO RELATED APPLICATIONS

This application claims priority from U.S. Provisional Application Ser. No. 60/896,714, filed Mar. 23, 2007, the contents of which are hereby incorporated by reference in their entirety.

FIELD

The disclosure generally relates to an optical polisher, and more specifically relates to a fixture for securing one or more optical connectors.

BACKGROUND

A typical fiber-optic cable generally includes concentric layers of protective or supporting material with an optical fiber located at the center of the cable. These fiber-optic cables typically have connectors located on each end to connect them to another fiber-optic cable or to a peripheral device. These connectors are high precision devices which position the fiber-optic cable in line with another fiber-optic cable or to a port on a peripheral device.

In order to communicate with a port or another cable, the end face of the connector (including a ferrule and an optical fiber) must typically abut an adjacent cable or port. The finish of the end face of a connector will typically determine the amount of back reflection at the connection site, thus greatly affecting the ability of the fiber-optic cable to transmit information. The apex offset, protrusion/recession, insertion loss, return loss, and angularity are also integral parameters of a connector's finish. As such, the end face of a connector is usually polished to exacting standards so as to produce a finish with minimal back reflection. For example, it is often necessary to polish the end face of the connector to a precise length, i.e., so the end face projects a predetermined amount from a reference point such as a shoulder on the fiber optic connector within a predetermined tolerance. Fiber-optic cables having multiple optical fibers can also be polished to produce a particular finish.

Optical fiber polishers typically include a rotating platen and an arm mechanism which positions and supports the connectors during the polishing process. Typically, the end face is lowered onto a film resting on the platen, and depending upon the film, the speed of the platen, the pressure applied, and its duration, acquires a finish suitable for a particular application.

Optical fiber polishers generally include a fixture coupled to the arm mechanism that is capable of holding and gripping one or more fiber optic connectors and advancing them under controlled conditions of speed and force to engage a plurality of fiber optic ends into engagement with a polishing member such as a rotatable platen having an abrasive surface. In order to achieve the precision typically needed, the fiber optic connectors must be secured within the fixture in such a way that all the connectors protrude from the bottom of the fixture at the same angle and to the same extent, thus assuring that each optical fiber is polished at the same degree and extent.

As such, fixtures typically employ complex clamping assemblies that are used to hold the connectors at the appropriate angle and depth. These clamping assemblies can require extensive manipulation from an operator in order to load and unload the connectors from the fixture, thus increasing the time needed to polish multiple connectors. In addition, existing fixtures can present obstacles when one or more of the clamping assemblies needs replacing. For example, when even a single clamping assembly needs replacing, an operator may need to halt polishing in order to send the entire fixture back to the manufacturer for repairs.

SUMMARY

According to one aspect of the invention, a fixture for securing one or more optical connectors for polishing can include a fixture base having a connector slot for receiving an optical connector and a clamping assembly mounted to the fixture base proximate the connector slot for securing the connector within the connector slot. The connector slot may have at least one side wall that defines a side wall plane. The clamp pad may be moveable relative to the fixture base between a clamping position in which the clamp pad is able to retain an optical connector in the connector slot and a loading position in which the clamp pad permits insertion and removal of an optical connector into and out of the connector slot. The movement of the clamp pad relative to the fixture base may be at an angle of less than 45 degrees relative to one of (i) a top surface of the fixture base, (ii) a plane perpendicular the side wall plane, or (iii) a plane defined by a portion of the fixture base top surface proximate to the connector slot.

In one embodiment, the angle that the clamp pad moves along is approximately 40 degrees. In another embodiment, the angle is approximately between 20 and 40 degrees. When in the clamping position, the clamp pad and the at least one side wall of the connector slot can cooperate to limit movement of an optical connector within a plane generally parallel the plane perpendicular the side wall plane. The clamp pad may include one or more pads for pressing into an optical connector and in some embodiments, the pads define a recess in the clamp pad. According to another embodiment, in the clamping position, the clamp pad and an edge of the connector slot cooperate to limit movement of an optical connector within a plane generally parallel the side wall plane. The clamp pad may have a flange adapted to contact an optical connector that cooperates with the edge of the connector slot to limit movement of the optical connector within the plane generally parallel the side wall plane.

According to certain embodiments of the invention, the side wall plane defined by the at least one side wall of the connector slot is angled relative to one of the top surface of the fixture base or the plane defined by the portion of the fixture base top surface proximate to the connector slot. In some cases the side wall plane is angled between about 0 and about 9 degrees. In further embodiments, the fixture may include a number of connector slots and a corresponding number of clamping assemblies mounted to the fixture base proximate the plurality of connector slots, respectively.

According to another aspect of the invention, some embodiments of the invention provide a fixture for securing one or more optical connectors for polishing that includes a fixture base having a connector slot for receiving an optical connector and a clamping assembly mounted to the fixture base proximate the connector slot. The clamping assembly includes a clamp pad movably coupled to a clamp screw for aligning the clamp pad with an optical connector within the connector slot. The clamp pad and the clamp screw are moveable relative to the fixture base between a clamping position in which the clamp pad is able to retain an optical connector in the connector slot and a loading position in which the clamp pad permits insertion and removal of an optical connector.

The movably coupled clamp pad may in some cases be rotatably coupled to the clamp screw. The clamp pad may define an opening for receiving a proximal end of the clamp screw, and in some cases includes a dowel for movably pinning the proximal end of the clamp screw within the opening in the clamp pad. According to certain embodiments, the clamping assembly defines a bore for guiding movement of the clamp screw and the clamp pad, the bore being at an angle of less than 45 degrees relative to one of (i) a top surface of the fixture base, (ii) a plane perpendicular a side wall plane of the connector slot, or (iii) a plane defined by a portion of the fixture base top surface proximate to the connector slot.

The fixture may be capable of polishing several optical connectors at once. In one embodiment, the fixture base includes multiple connector slots and a single clamping assembly includes a plurality of clamp pads for securing, respectively, multiple optical connectors within the multiple connector slots.

According to another aspect of the invention, a method for securing an optical connector for polishing is provided. According to one embodiment, the method includes providing a polishing fixture having a fixture base with a connector slot and a clamping assembly mounted proximate the connector slot. The connector slot can have at least one side wall defining a side wall plane and the clamping assembly can include a clamp pad for securing an optical connector within the connector slot. The method further includes loading an optical connector in the connector slot and pressing the clamp pad against the optical connector to secure the optical connector against a side wall of the connector slot and an edge of the connector slot.

According to some embodiments, the method further includes pressing the optical connector against the side wall of the connector slot with relatively more pressure than against the edge of the connector slot. In one case the clamp pad is moved towards the optical connector at an angle of less than 45 degrees relative to one of (i) a top surface of the fixture base, (ii) a plane perpendicular the side wall plane, or (iii) a plane defined by a portion of the fixture base top surface proximate to the connector slot.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

The embodiments herein disclose an optical polisher which is particularly adapted to provide precise and relatively uniform polishing of a number of optical fiber connectors and optical fiber. For the purposes of explanation only, the disclosed embodiments are described in terms of an apparatus which is particularly configured for optical fiber polishing. However, one skilled in the art can readily appreciate that the embodiments of the invention can be adapted for a variety of different polishing applications.

Figure 1:
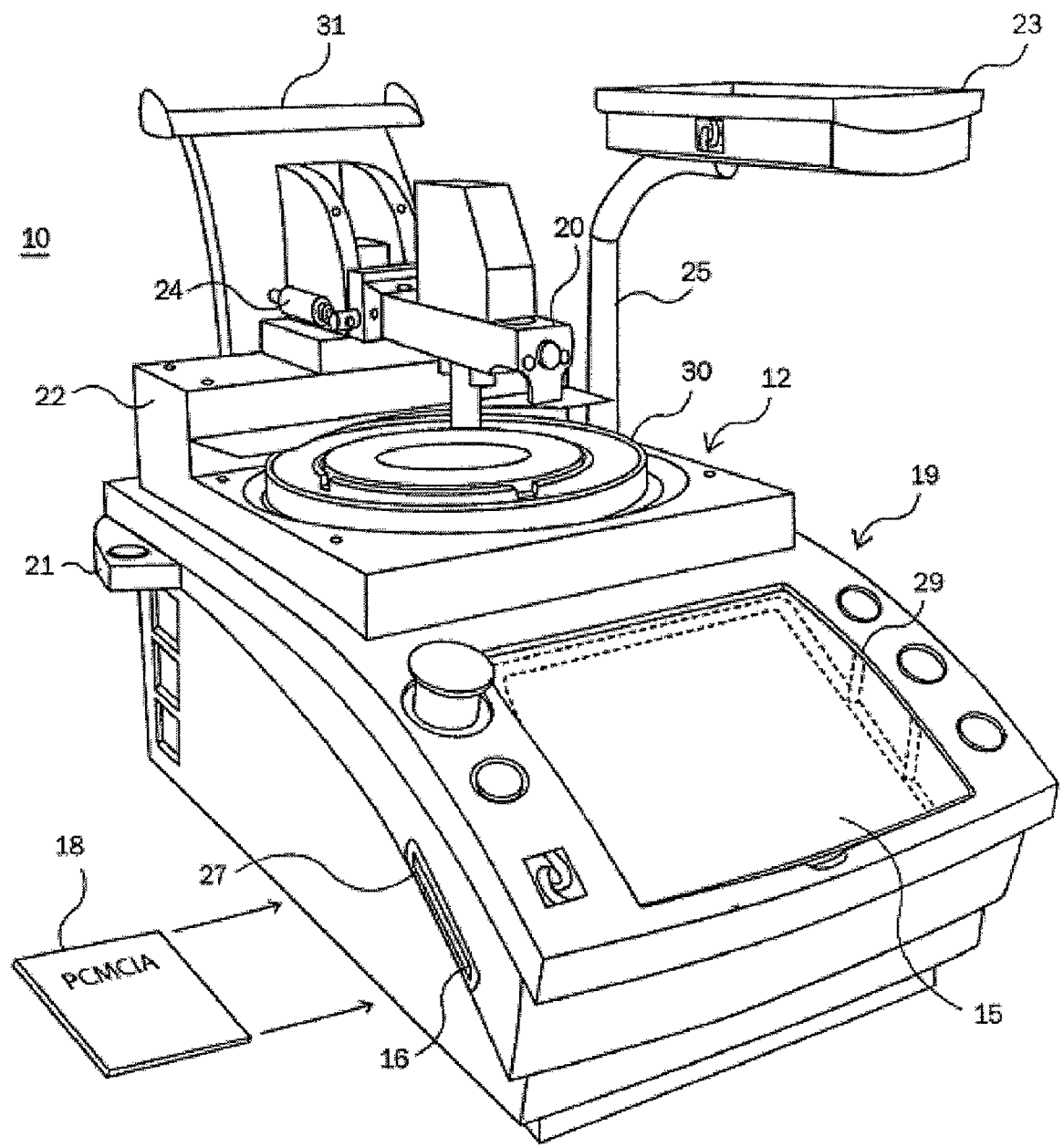
FIG. 1 is a polisher according to some embodiments of the invention.

FIG. 1 is a perspective view of a polisher 10 according to some embodiments of the invention. The polisher 10 includes a polishing unit 12 comprising a pneumatic overarm assembly 20 and a platen assembly 30, a processor, a porting device 16 for a portable memory device 18, and an input device 15.

The polisher 10 maintains rigid control of each polishing process through feedback mechanisms which control the operation of both the platen assembly 30 and the pneumatic overarm assembly 20. The feedback mechanisms communicate with the processor to continuously monitor the performance of the platen assembly 30 and the pneumatic overarm assembly 20, and ensures that both are functioning at their set levels.

In some embodiments, the processor communicates with the porting device 16, the input device 15 and a USB port for a keyboard, to enable rapid programming of the polisher 10. The input device 15 also serves as a visual indicator of actual operating parameters.

As shown in FIG. 1, in some embodiments, the polisher 10 includes a housing 19 which is particularly adapted for the polishing process. The housing's main function is to support and align the polishing unit 12, the processor, and the input device 15 in an operative position.

The housing 19 also includes a retractable ring 21 for use as a point of attachment for ancillary devices. One such ancillary device is a drip pan 23 rotatively coupled to the retractable ring 21 by an elongated stem 25. A slot 27 is inserted along one side of the housing 19 to allow a portable memory device to access the porting device 16. A retractable shield 29 is located along a front portion of the housing 19 to protect the input device 15, which is angularly supported in the front of the housing 19. A cable management attachment 31 is connected to the back of the housing for supporting fiber-optic cables undergoing a polishing process.

Figure 2:
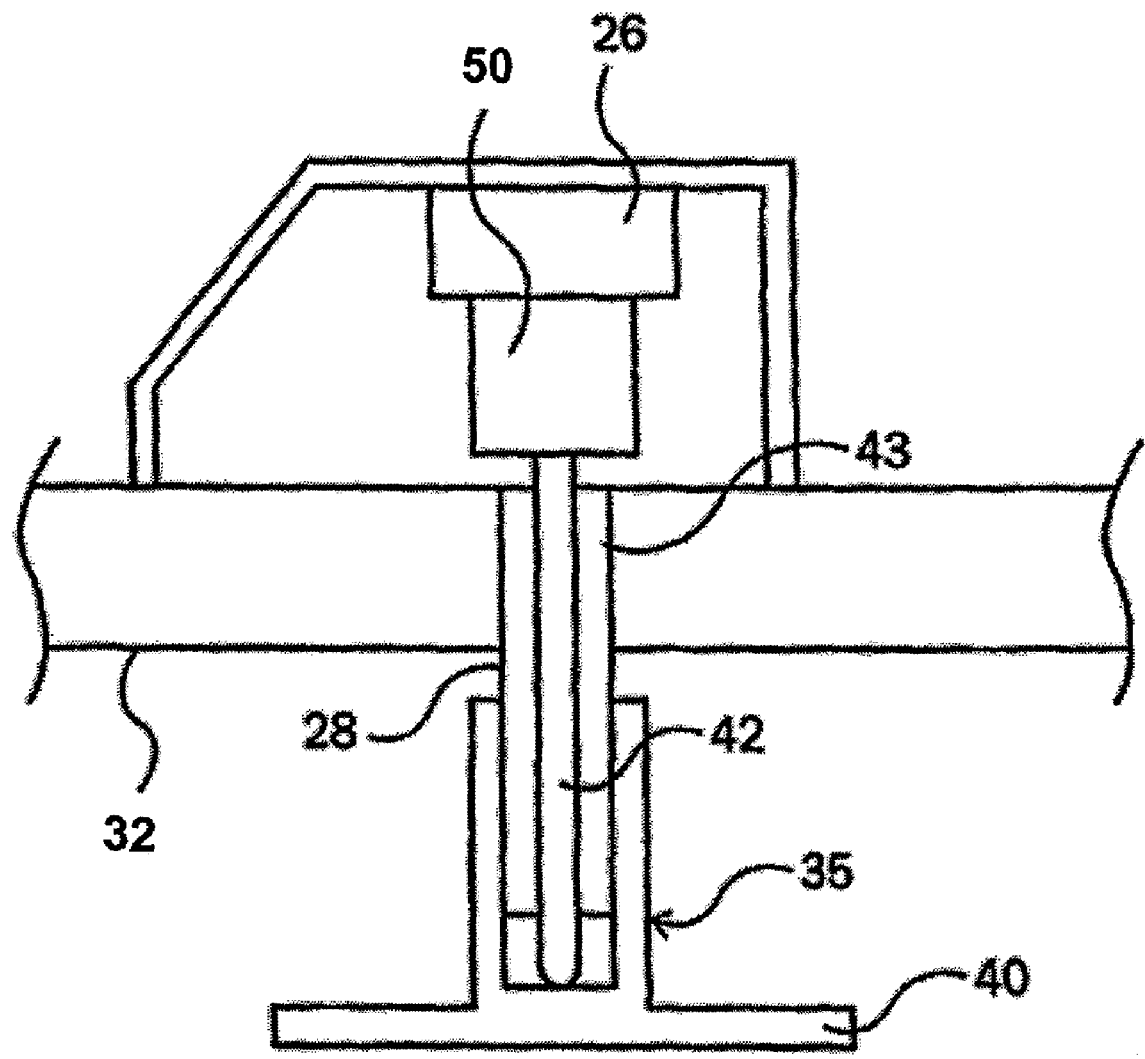
FIG. 2 is a cross-section partial view of an overarm assembly coupled to a fixture according to some embodiments of the invention.

As shown in FIGS. 1 and 2, the pneumatic arm assembly 20 includes an overarm 32 hingedly secured along one end to a base 22, the overarm 32 rotatable about the hinged end. A pair of pneumatic cylinders 24 are coupled to the overarm 32, opposing rotational movement thereof. A mounting pole 28 depends from the overarm 32. A polishing fixture 40 includes a mounting tube 35 which releasably engages the mounting pole 28.

As shown in FIG. 2, in one embodiment, a load cell 26 is positioned on the overarm 20 adjacent to the mounting pole 28 and coupled to an air cylinder 50. A passage 43 extends generally concentrically through the overarm 20 and the mounting pole 28. Disposed within the passage 43 is a plunger 42. The plunger 42 is coupled to the air cylinder 24 and the fixture 40. During operation, the plunger translates pressure applied to the fixture by moving longitudinally with respect to the mounting pole 28. The longitudinal movement of the plunger 42 results in an increase or decrease in the pressure within the cylinder 24. The load cell 26 reads this pressure and transmits it to the processor, enabling the processor to determine a contact pressure.

Referring to FIG. 1, the platen assembly 30 includes a platen 33 that is rotatively supported by a stage and is coupled to the motor (not shown) within the housing 19. The platen 33 has a top surface adapted to receive an abrasive film or pad. Preferably, the platen 33 is rotated in an eccentric fashion, and so an eccentric drive arm is used to couple the motor to the platen 33.

Figure 3:
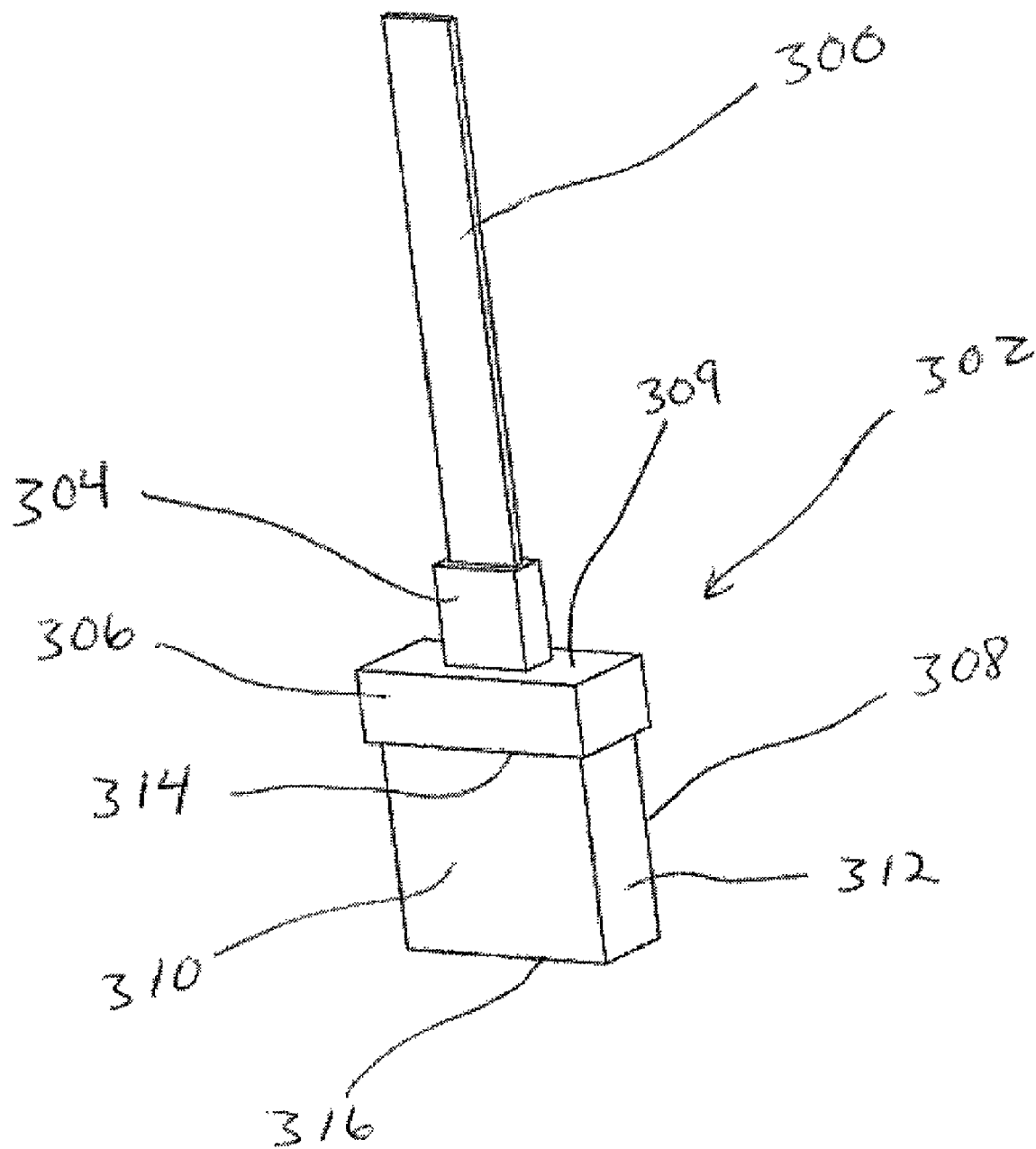
FIG. 3 is a perspective view of an optical connector according to some embodiments of the invention.

FIG. 3 is a perspective view of an MT connector. Although an MT connector is described herein with respect to several embodiments, it will be appreciated that some exemplary fixtures can receive and secure other connectors employed in the art. For example only, and not by way of limitation, exemplary fixtures can receive MT-RJ connectors and/or other optical connectors. In some embodiments, a fixture can be adapted to receive one or more different types of connectors. Referring to FIG. 3, a fiber optic cable 300 is shown integrated with an MT connector 302. The MT connector can include a strain relief 304, a shoulder 306, and a ferrule 308. The shoulder 306 includes a top face 309 to which the strain relief 304 is attached. The ferrule 308 generally includes two end faces 310 and two side faces 312. In a typical MT connector, a shoulder edge 314 of the shoulder 306 is manufactured substantially parallel with a ferrule edge 316 of the ferrule 308. Thus, according to some embodiments, the bottom edge of the ferrule edge 316 and ferrule 308 can be squared within a fixture with reference to the shoulder edge 314.

Figure 4:
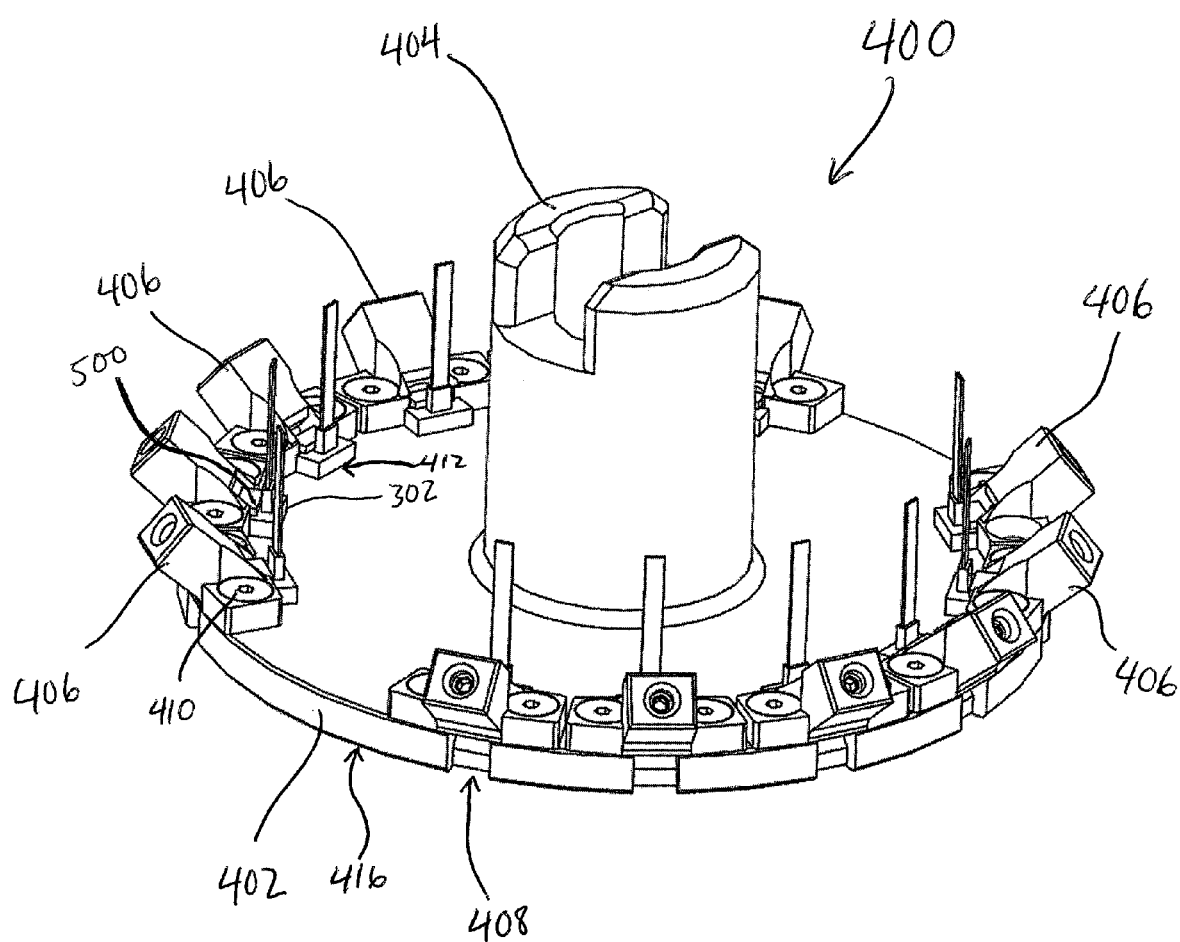
FIG. 4 is a perspective view of a fixture according to some embodiments of the invention.
Figure 5:
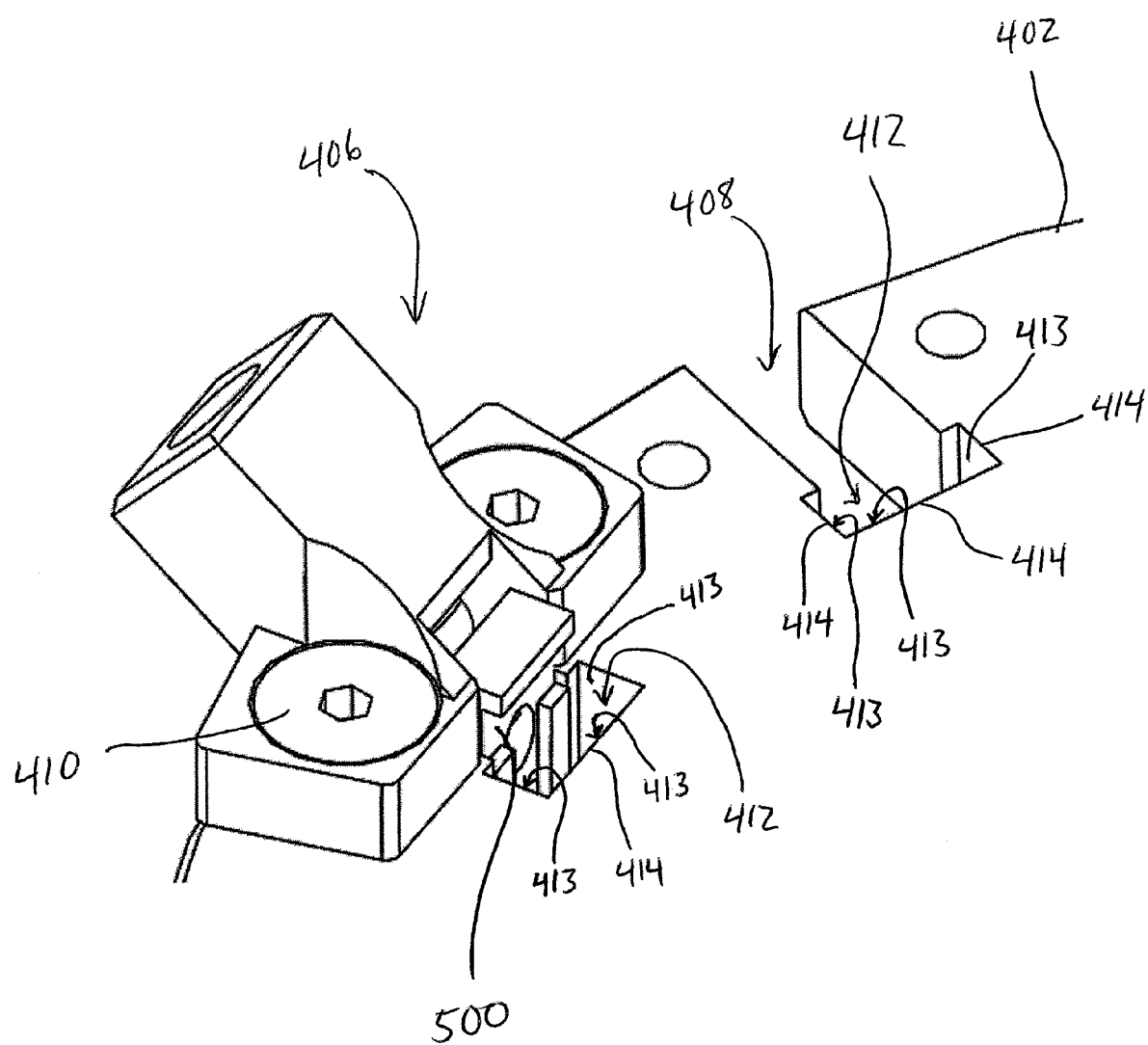
FIG. 5 is a perspective view of a clamp assembly mounted to a fixture base according to some embodiments of the invention.

FIG. 4 is a perspective view of a fixture 400 according to some embodiments, which is adapted to enable one or more connectors to move longitudinally in response to the pressure being applied by the platen. The fixture 400 includes a fixture base 402 and a mounting tube 404 extending generally perpendicular from the fixture base 402, for coupling the fixture 400 with the polisher 10 via a mounting pole, such as mounting pole 28 in FIG. 2. The fixture base 402 includes a number of clamping assemblies 406 positioned circumferentially around the fixture base 402. It will be appreciated that many quantities of clamping assemblies 406 may be included with the fixture 400. With reference to FIGS. 4 and 5, the clamping assemblies 406 can be mounted on the fixture base 402 about a clamping slot 408. The clamping assemblies can be mounted to the fixture base 402 with flat head screws 410 or other fasteners known in the art. A connector slot 412 with at least three side walls 413 and at least three edges 414 is disposed at the end of each clamping slot 408 and is adapted to receive a connector from a fiber optic cable. In some embodiments, side walls 413 are planar and edges 414 are linear, as shown in FIG. 5. However, it is understood that side walls 413 could instead provide a flat mating surface for connector faces 310 without being planar (e.g., walls with one or more cavities). For example, the ferrule 308 of the MT connector 302 of FIG. 3 can be received within the connector slot 412, with the shoulder edge 314 resting upon at least one edge 414 of the connector slot 412. The fixture base 402 has a thickness that allows a connector ferrule 308 to protrude through the connector slot 412 and out through a bottom surface 416 of the fixture base 402 such that the ferrule edge 316 is positioned a predetermined distance from the opposite side of the fixture base 402.

With reference to FIG. 5, an exemplary clamp pad 500 can be incorporated into the clamping assembly 406. As shown in FIG. 5 and described further herein, the clamp pad 500 is coupled within the clamping assembly 406 such that it can extend toward the connector slot 412 in order to clamp or hold a connector within the connector slot 412. As shown in FIG. 4, each clamping assembly 406 includes clamp pad 500 securing a connector 302 within a connector slot 412.

Figure 6:
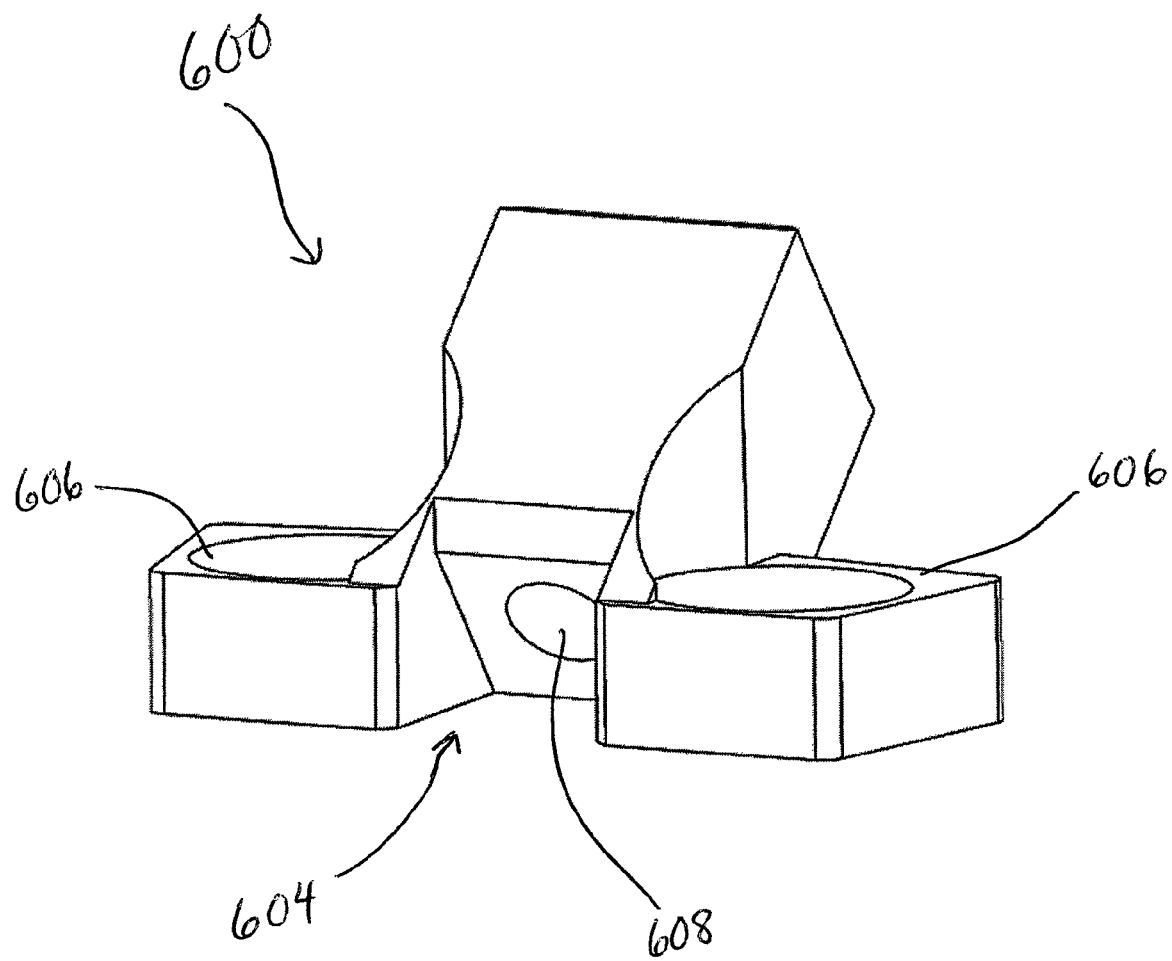
FIG. 6 is a perspective view of a clamp top according to some embodiments of the invention.

FIG. 6 is a perspective view of a clamp top 600, according to some embodiments that is incorporated into each clamping assembly 406. The clamp top 600 generally includes a clamp pad recess 604, one or more screw mounts 606 for coupling the clamp top 600 to the fixture base 402, and an elongate bore 608 for receiving a clamp screw as will be further described. According to alternate embodiments, each clamp top 600 can have multiple bores 608 and clamp pad recesses 604 in order to secure more than one connector with the clamp top 600. For example, in some embodiments, a clamp top 600 that can secure multiple connectors is mounted to the fixture base 402 with less than two screw mounts 606 per connector. Embodiments with fewer screw mounts 606 can advantageously provide closer connector spacing, thus increasing the number of connectors that a fixture can receive.

Figure 7:
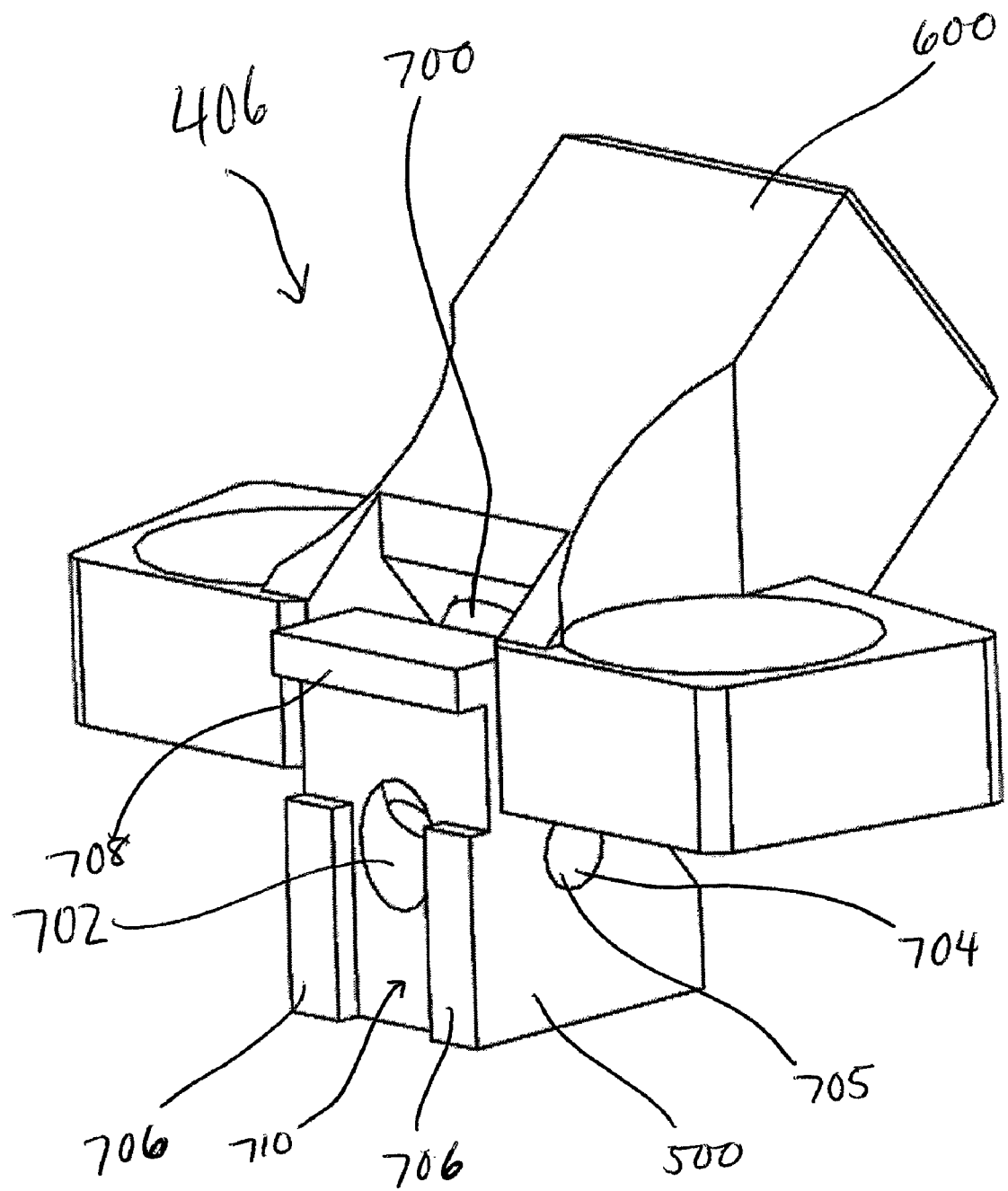
FIG. 7 is a perspective view of a clamping assembly according to some embodiments of the invention.

FIG. 7 is a perspective view of a clamping assembly 406 according to some embodiments of the invention. The clamping assembly 406 includes a clamp pad 500 functionally coupled to the clamp top 600 previously described, with a clamp screw 700 mounted within the bore 608 of the clamp top 600. The clamp pad 500 includes an opening 702 for receiving the clamp screw 700 and dowel holes 704 for receiving a dowel 705 that functions to retain one end of the clamp screw 700 within the opening 702. The clamp pad 500 further includes pads 706 and a flange 708 as shown in the embodiment of FIG. 7. The pads 706 are adapted to press against an end face 310 of the ferrule 308 so as to clamp the connector 302 against a side wall 413 of the connector slot 412. In some embodiments, the pads 706 define a recess 710 between the pads that can accommodate any protruding glue spots on a connector end face 310. In some embodiments, the pads 706 can extend across the clamp pad 500 such that there is no recess 710. With further reference to FIG. 7, the flange 708 extends from a top portion of the clamp pad 500 and is adapted to contact the top face 309 of the connector shoulder 306 and push and hold the shoulder 306 down against at least one connector slot edge 414.

Figure 8:
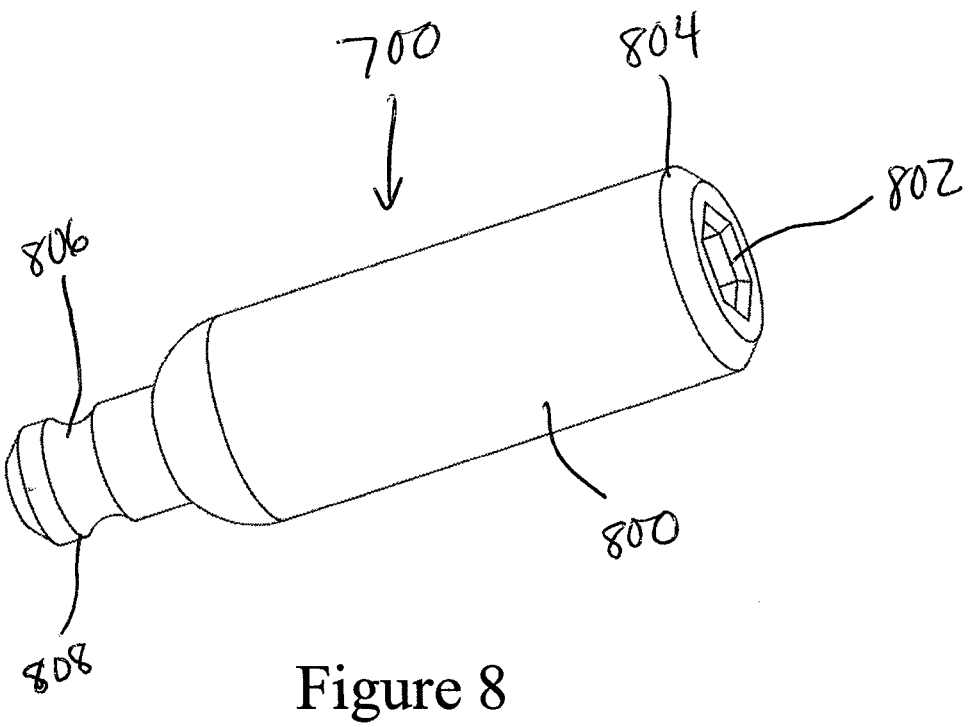
FIG. 8 is a perspective view of a clamp screw according to embodiments of the invention.

FIG. 8 is a perspective view of a clamp screw 700 according to embodiments of the invention. Clamp screw 700 includes a body 800, a drive head 802 located at a distal end 804, and an annular recess 806 extending around a proximal end 808 of the clamp screw 700. As is shown in FIG. 8, in some embodiments, the drive head can be configured to receive a torque wrench. In some embodiments, the clamp screw body 800 can be externally threaded, and the bore 608 of the clamp top 600 can be internally threaded so that the clamp screw 700 can be advanced or retracted within the bore 608. As will be further discussed, the annular recess 806 can cooperate with the dowel 705, such that the dowel 705 pins the proximal end 808 of the clamp screw within the clamp pad opening 702. In other embodiments, the proximal end 808 can define a ball without an annular recess 806, such that the dowel 705 pins the ball within the opening 702. As discussed further below, although the dowel 705 pins the proximal end 808 of the clamp screw within the opening 702, the dowel 705 and the annular recess 806 are shaped to allow limited rotation of the clamp pad 500 relative to the clamp screw 700. As further described below, such limited rotation supports proper engagement of the clamp pad 500 with the connector 302 during loading of the connector 302 within fixture 400.

Figure 9:
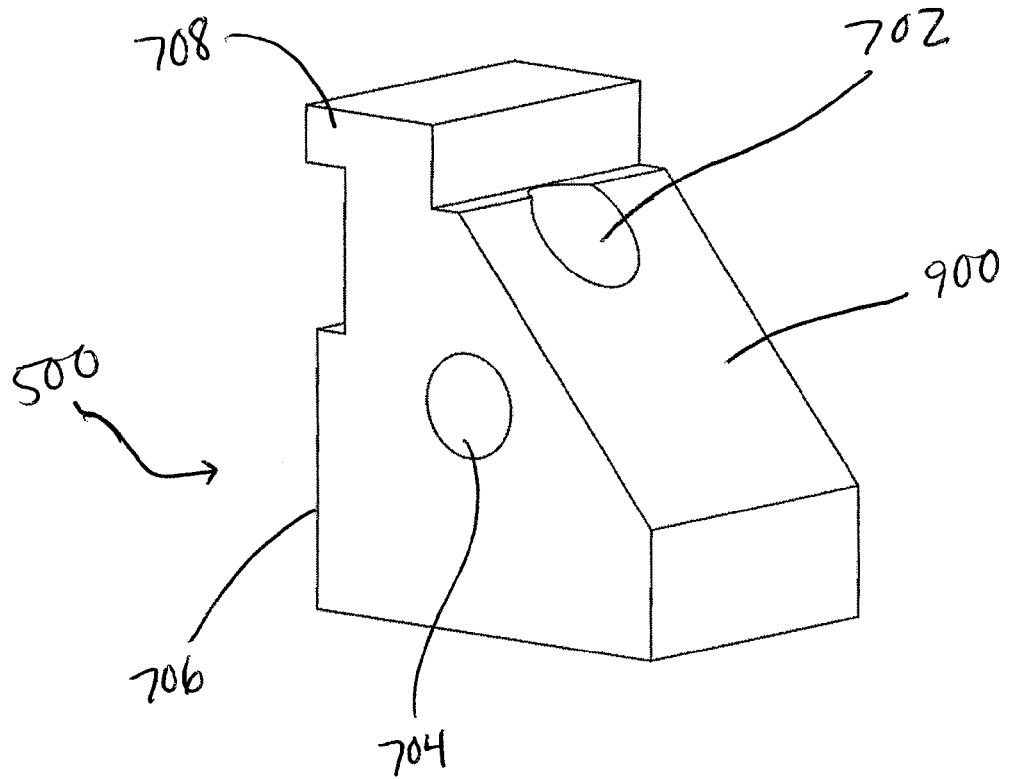
FIG. 9 is a perspective view of the clamp pad according to embodiments of the invention.

FIG. 9 is a perspective view of the clamp pad 500, showing the opening 702 in a back surface 900 into which the proximal end 808 of the clamp screw 700 can be inserted. In some embodiments, the opening 702 can be cup-shaped or concave to allow the clamp screw 700 and the clamp pad 500 to be coupled in a ball-and-socket manner to permit the limited rotation there between described above. In some embodiments, the back surface 900 can be angled with respect to the clamp pads 706 to match the shape of the clamp pad recess 604 in the clamp top 600, so that the clamp pad 500 can be retracted within the recess 604.

Figure 10:
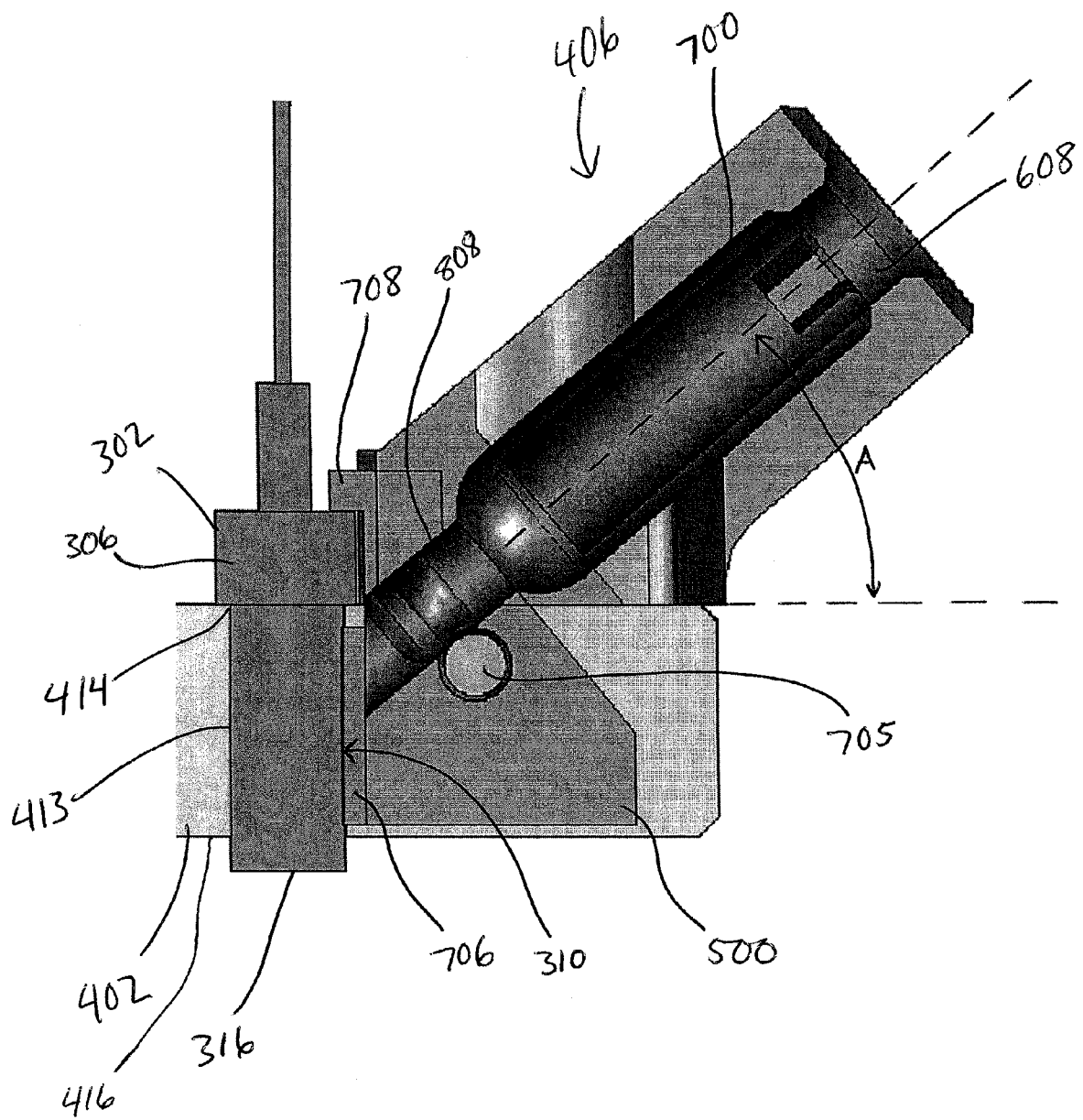
FIG. 10 is a cross-section of a connector and a clamping assembly mounted to a fixture base according to embodiments of the invention.

FIG. 10 is a cross-section of a connector 302 and a clamping assembly 406 mounted to the fixture base 402. The cross-section illustrates the operation of the clamping assembly. As the clamp screw 700 is advanced through the bore 608, the proximal end 808 of the clamp screw 700 simultaneously pushes the clamp pad 500 leftward (radially inward with reference to FIG. 4) and down at an angle substantially similar to a bore angle A. In some embodiments, bore angle A may be defined as the angle between the central axis of bore 608 and a line that extends radially relative to the fixture base 402 and through the plane defined by the shoulder edge 314 of connector 302 when loaded in slot 412. In other embodiments, bore angle A may be defined as the angle between the central axis of bore 608 and a line that extends radially relative to the fixture base 402 and through the plane perpendicular to a plane defined by one of the side walls 413. As the clamp pad 500 comes in contact with the connector 302, the flange 708 pushes the connector shoulder 306 against the connector slot edge 414. The clamp pads 706 contact the end face 310 of the connector ferrule 308 and push the ferrule 308 back against the connector slot side wall 413. In some embodiments, the clamp pad opening 702 and the dowel 705 cooperate to couple the clamp pad 500 to the proximal end 808 of the clamp screw 700 such that the clamp pad 500 "floats" within the clamp pad recess 604, i.e., the clamp pad 500 is able to rotate somewhat relative to the clamp screw 700 and within the clamp pad recess 604. This floating is preferable in some embodiments so that as the clamp screw 700 is advanced down the bore 608, the clamp pad 500 can adjust its orientation slightly if it does not at first align with the connector 302.

With further reference to FIG. 10, the connector 302 can be removed from the fixture by retracting the clamp screw 700 back up the bore 608. The dowel 705 acts to retain the proximal end 808 of the clamp screw 700 within the clamp pad opening 702, so that the clamp pad 500 is retracted with the clamp screw 700. Moreover, since flange 708 extends only part way across top face 309 of connector 302, short of strain relief 304, clamp pad 500 need not be extended or retracted large extents in order to hold and release connector 302. The need for such limited movement facilitates fast and easy loading and unloading of connectors 302 from fixture 400.

With reference again to FIG. 10, in some embodiments of the fixture, the bore angle A with respect to the fixture base 402 is such that the clamp pad 500 exerts relatively more pressure against the end face 310 of the ferrule 308 than down on the shoulder 306. This can be important so that the connector 302 is held within the connector slot 412 without shearing the connector shoulder 306 or otherwise damaging the connector 302. In some embodiments, the connector slot side wall 413 is square with the top surface of fixture base 402 proximate edges 414. Moreover, in some embodiments, the slot side wall 413 is also square with the bottom surface 416 of the fixture base 402. In alternative embodiments, as described below, the slot side wall is not square with the bottom surface 416 of the fixture base 402. With the connector 302 clamped against the connector slot side wall 413 and the connector shoulder 306 resting atop the connector slot edge 414, the connector 302 can be positioned with the bottom edge 316 of the ferrule 308 substantially parallel to the fixture 400, thus ensuring even polishing of the optical fibers extending out of the ferrule 308. In some embodiments, the bore angle A can be approximately 45 degrees or less. In some embodiments the bore angle A can be approximately 40 degrees. In some embodiments, the bore angle A ranges from approximately 20 degrees to 40 degrees. Those skilled in the art will appreciate that a number of suitable bore angles A are possible. Moreover, those skilled in the art will appreciate that mechanisms other than clamp screw 700 and bore 608 may be employed in clamping assembly 406 to move clamp pad 500 along an angled path such that the clamp pad is moved simultaneously radially inward (as defined with reference to FIG. 4) and downward toward the bottom surface 416 of fixture base 402 to hold connector 302 in place for polishing.

In alternative embodiments, as briefly noted above, the connector slot 412 can be angled to facilitate angled polishing of the optical fibers. For example, the connector slot 412 can in some embodiments be angled from 0-9 degrees away or towards the fixture perimeter. The clamping assembly 406 can be suitably mounted at an angle to correspond with the angled slot. It will be appreciated that a wide variety of angles are possible for the connector slot.

In another alternative, the clamping assembly 406 can act substantially as described above, except that the clamping assembly 406 can be rotated 90 degrees with respect to the connector 302, such that the clamping assembly 406 can clamp a side face 312 of the connector 302 against another side wall 413 of the connector slot 412. In another alternative, the clamping assembly 406 and connector slot 412 can be rotated 180 degrees with respect to the connector 302, such that the clamp pad 500 is shifted radially outward to hold connector 302 within the fixture.

In the foregoing detailed description, the invention has been described with reference to specific embodiments. However, it may be appreciated that various modifications and changes can be made without departing from the scope of the invention. Thus, some of the features of preferred embodiments described herein are not necessarily included in preferred embodiments of the invention which are intended for alternative uses.

What is claimed is:

1. A fixture for securing one or more optical connectors for polishing, comprising:
   a fixture base comprising a connector slot for receiving an optical connector, the connector slot defined by at least one side wall, the side wall defining a side wall plane; and
   a clamping assembly mounted to the fixture base proximate the connector slot and comprising a clamp pad, the clamp pad being moveable relative to the fixture base between a clamping position in which the clamp pad is able to retain an optical connector in the connector slot and a loading position in which the clamp pad permits insertion and removal of an optical connector, movement of the clamp pad from the clamping position to the loading position being along a substantially straight path oriented at an angle of less than 45 degrees relative to one of (i) a top surface of the fixture base, (ii) a plane perpendicular the side wall plane, and (iii) a plane defined by a portion of the fixture base top surface proximate to the connector slot.

2. The fixture of claim 1, wherein the angle is approximately 40 degrees relative to one of (i) the top surface of the fixture base, (ii) the plane perpendicular the side wall plane, and (iii) the plane defined by the portion of the fixture base top surface proximate to the connector slot.

3. The fixture of claim 1, wherein the angle is approximately between 20 and 40 degrees relative to one of (i) the top surface of the fixture base, (ii) the plane perpendicular the side wall plane, and (iii) the plane defined by the portion of the fixture base top surface proximate to the connector slot.

4. The fixture of claim 1, wherein in the clamping position the clamp pad and the at least one side wall of the connector slot cooperate to limit movement of an optical connector within a plane generally parallel the plane perpendicular the side wall plane.

5. The fixture of claim 4, wherein the clamp pad further comprises one or more pads for pressing into an optical connector.

6. The fixture of claim 5, wherein the one or more pads define a recess in the clamp pad.

7. The fixture of claim 1, wherein in the clamping position the clamp pad and an edge of the connector slot cooperate to limit movement of an optical connector within a plane generally parallel the side wall plane.

8. The fixture of claim 7, wherein the clamp pad further comprises a flange adapted to contact an optical connector, the flange cooperating with the edge of the connector slot to limit movement of the optical connector within the plane generally parallel the side wall plane.

9. The fixture of claim 1, wherein the side wall plane is angled relative to one of the top surface of the fixture base or the plane defined by the portion of the fixture base top surface proximate to the connector slot.

10. The fixture of claim 9, wherein the side wall plane is angled between about 0 and about 9 degrees.

11. The fixture of claim 9, further comprising a plurality of connector slots and a plurality of clamping assemblies mounted to the fixture base proximate the plurality of connector slots, respectively.

12. A fixture for securing one or more optical connectors for polishing, comprising:
a fixture base having a connector slot for receiving an optical connector; and
a clamping assembly mounted to the fixture base proximate the connector slot, the clamping assembly defining a bore having a bore axis, the clamping assembly including a clamp pad movably coupled to a clamp screw received within the bore for aligning the clamp pad with an optical connector, the clamp pad and the clamp screw being moveable relative to the fixture base along a substantially straight path oriented along the bore axis from a clamping position in which the clamp pad is able to retain an optical connector in the connector slot to a loading position in which the clamp pad permits insertion and removal of an optical connector.

13. The fixture of claim 12, wherein the clamp pad is rotatably coupled to the clamp screw.

14. The fixture of claim 13, wherein the clamp pad defines an opening for receiving a proximal end of the clamp screw.

15. The fixture of claim 14, wherein the clamp pad includes a dowel for movably pinning the proximal end of the clamp screw within the opening in the clamp pad.

16. The fixture of claim 12, wherein the fixture base includes multiple connector slots and wherein the clamping assembly includes a plurality of clamp pads for securing, respectively, multiple optical connectors within the multiple connector slots.

17. The fixture of claim 12, wherein the bore has an angle of less than 45 degrees relative to one of (i) a top surface of the fixture base, (ii) a plane perpendicular a side wall plane of the connector slot, and (iii) a plane defined by a portion of the fixture base top surface proximate to the connector slot.

18. A method for securing an optical connector for polishing, comprising:
providing a polishing fixture having a fixture base with a connector slot and a clamping assembly mounted proximate the connector slot, the connector slot having at least one side wall defining a side wall plane, the clamping assembly including a clamp pad for securing an optical connector within the connector slot;
loading an optical connector in the connector slot;
moving the clamp pad along a substantially straight path from a loading position towards the optical connector to a clamping position, the substantially straight path oriented at an angle of less than 45 degrees relative to one of (i) a top surface of the fixture base, (ii) a plane perpendicular the side wall plane, and (iii) a plane defined by a portion of the fixture base top surface proximate to the connector slot; and
pressing the clamp pad against the optical connector to secure the optical connector against a side wall of the connector slot and an edge of the connector slot.

19. The method of claim 18, further comprising pressing the optical connector against the side wall of the connector slot with relatively more pressure than against the edge of the connector slot.

* * * * *